(12) United States Patent
Yoon et al.

(10) Patent No.: US 11,990,588 B2
(45) Date of Patent: May 21, 2024

(54) BATTERY CELL INCLUDING SHORT-CIRCUIT INDUCING MEMBER AND SAFETY EVALUATION METHOD USING SAME

(71) Applicant: LG CHEM, LTD., Seoul (KR)

(72) Inventors: Seo Young Yoon, Daejeon (KR); Tae Jong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 572 days.

(21) Appl. No.: 17/276,333

(22) PCT Filed: Mar. 26, 2020

(86) PCT No.: PCT/KR2020/004087
§ 371 (c)(1),
(2) Date: Mar. 15, 2021

(87) PCT Pub. No.: WO2020/209529
PCT Pub. Date: Oct. 15, 2020

(65) Prior Publication Data
US 2022/0045373 A1 Feb. 10, 2022

(30) Foreign Application Priority Data

Apr. 9, 2019 (KR) .......................... 10-2019-0041138

(51) Int. Cl.
*H01M 10/42* (2006.01)
*H01M 10/0585* (2010.01)
(Continued)

(52) U.S. Cl.
CPC ... *H01M 10/4235* (2013.01); *H01M 10/0585* (2013.01); *H01M 10/4285* (2013.01);
(Continued)

(58) Field of Classification Search
CPC ......... H01M 10/4235; H01M 10/0585; H01M 10/4285; H01M 50/105; H01M 50/46; H01M 50/489
See application file for complete search history.

(56) References Cited

U.S. PATENT DOCUMENTS

| 6,891,353 B2 | 5/2005 | Tsukamoto et al. |
| 2013/0127473 A1 | 5/2013 | Ikeda |

(Continued)

FOREIGN PATENT DOCUMENTS

| CN | 103004003 A | 3/2013 |
| CN | 204614848 U | 9/2015 |

(Continued)

OTHER PUBLICATIONS

International Search Report issued in corresponding International Patent Application No. PCT/KR2020/004087 dated Jul. 3, 2020.

(Continued)

*Primary Examiner* — Jimmy Vo
(74) *Attorney, Agent, or Firm* — Morgan, Lewis & Bockius LLP

(57) ABSTRACT

The present invention relates to: a battery cell including a punched portion formed through a separator, and a short-circuit inducing member disposed on the punched portion; and a method for evaluating the safety of a battery under internal short-circuit conditions by using the battery cell. Using the battery cell of the present invention, the safety of a battery under internal short-circuit conditions can be easily evaluated without physical deformation or reassembly of the battery cell.

11 Claims, 6 Drawing Sheets

(51) Int. Cl.
*H01M 50/105* (2021.01)
*H01M 50/46* (2021.01)
*H01M 50/489* (2021.01)

(52) U.S. Cl.
CPC ......... *H01M 50/105* (2021.01); *H01M 50/46* (2021.01); *H01M 50/489* (2021.01)

(56) References Cited

U.S. PATENT DOCUMENTS

| | | | | |
|---|---|---|---|---|
| 2013/0209841 | A1* | 8/2013 | Keyser | H01M 10/4285 429/50 |
| 2018/0019476 | A1 | 1/2018 | Qiao et al. | |
| 2018/0120381 | A1* | 5/2018 | Fuchs | G01R 31/385 |

FOREIGN PATENT DOCUMENTS

| | | |
|---|---|---|
| EP | 3336933 A1 | 6/2018 |
| JP | 2006-505430 A | 2/2006 |
| JP | 2008-218390 A | 9/2008 |
| JP | 2008-270090 A | 11/2008 |
| JP | 2011-003527 A | 1/2011 |
| JP | 2017-117628 A | 6/2017 |
| JP | 2017-182976 A | 10/2017 |
| JP | 2017182976 A * | 10/2017 |
| JP | 2018-137141 A | 8/2018 |
| KR | 10-2006-0087180 A | 8/2006 |
| KR | 10-2013-0030807 A | 3/2013 |
| KR | 10-2014-0066364 A | 6/2014 |
| KR | 10-2018-0046370 A | 5/2018 |
| WO | 2018/230029 A1 | 12/2018 |

OTHER PUBLICATIONS

Written Opinion issued in corresponding International Patent Application No. PCT/KR2020/004087 dated Jul. 3, 2020.
Examination Report issued in corresponding Indian Patent Application No. 202117006979 dated Feb. 20, 2023.
Office Action issued in corresponding Japanese Patent Application No. 2021-511613 dated Apr. 18, 2022.
Office action dated Aug. 23, 2023 issued in corresponding Chinese Patent Application No. 202080005158.1.
International Search Report (with partial translation) and Written Opinion dated Jul. 3, 2020, issued in corresponding International Patent Application No. PCT/KR2020/004087.

* cited by examiner

[FIG. 1]
-- PRIOR ART --
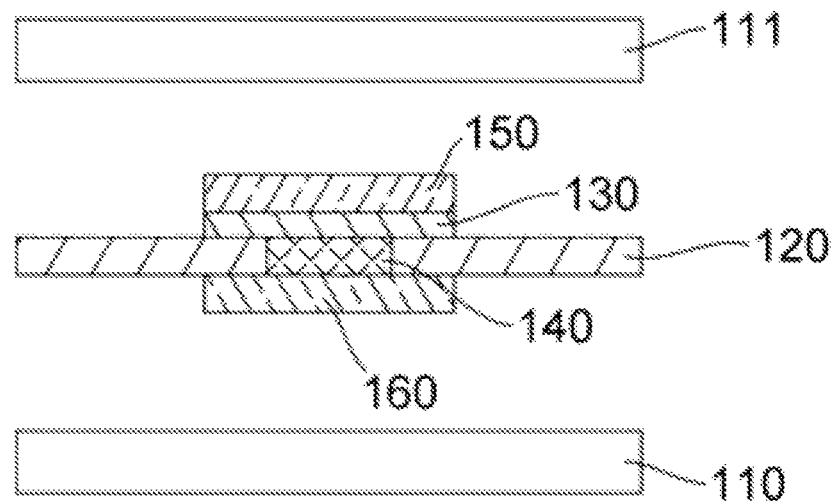

[FIG. 2]
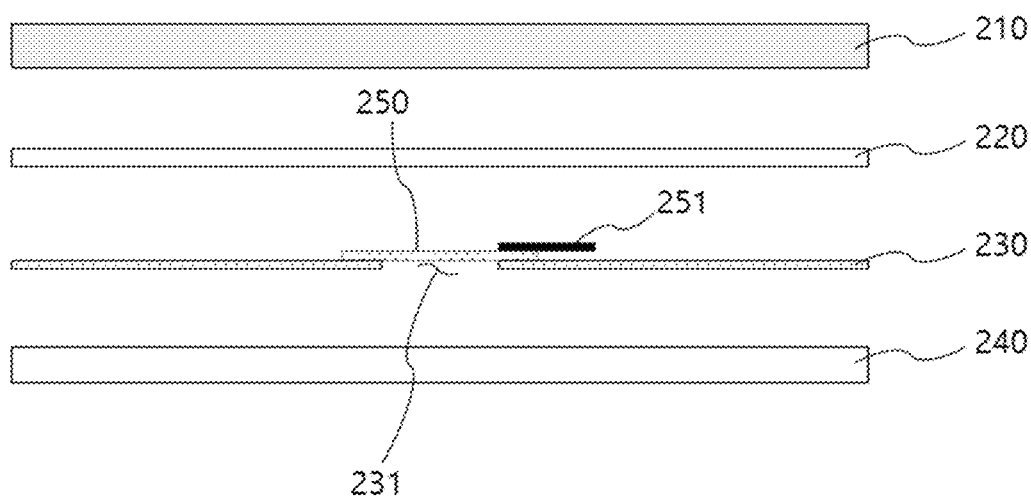

[FIG. 3]
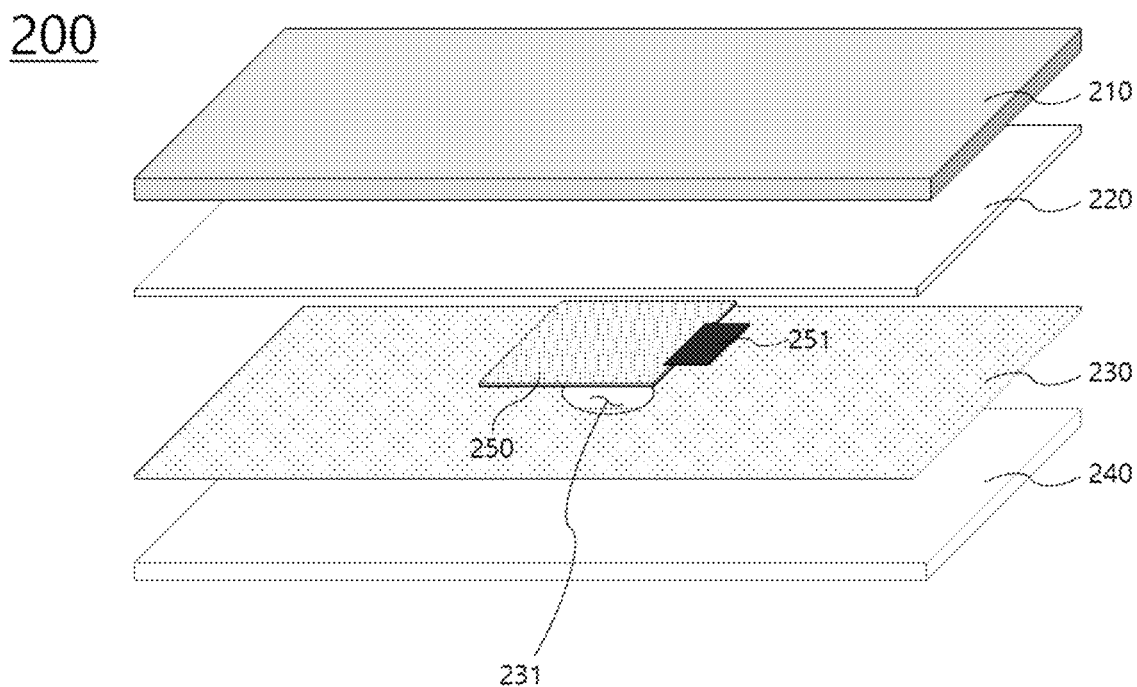

[FIG. 4]
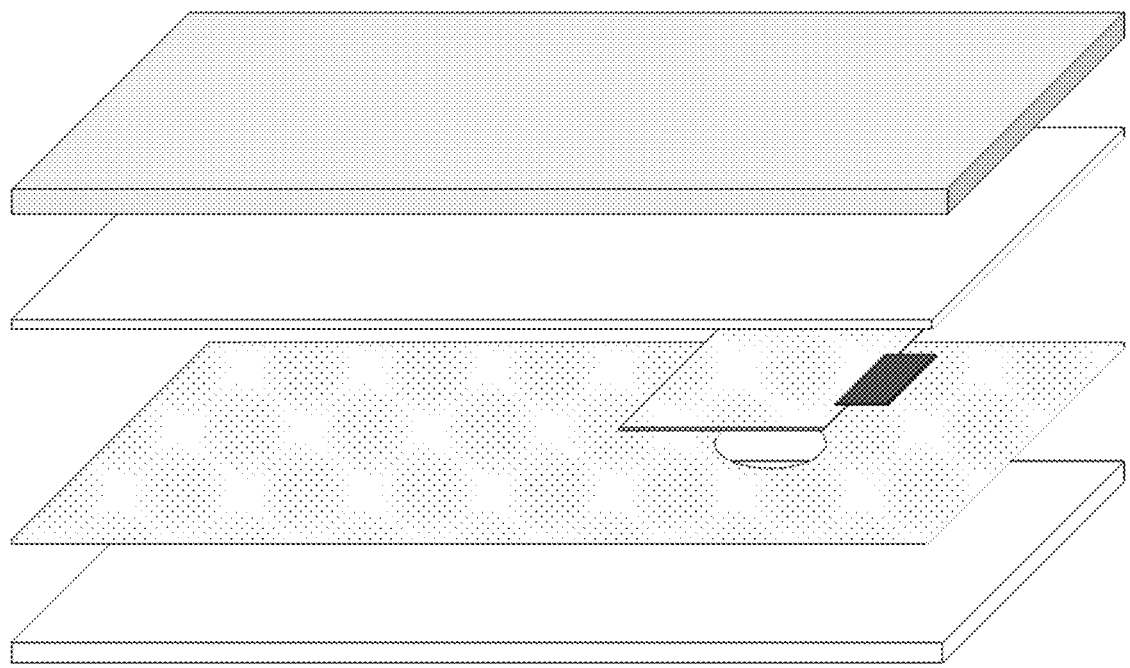

[FIG. 5]
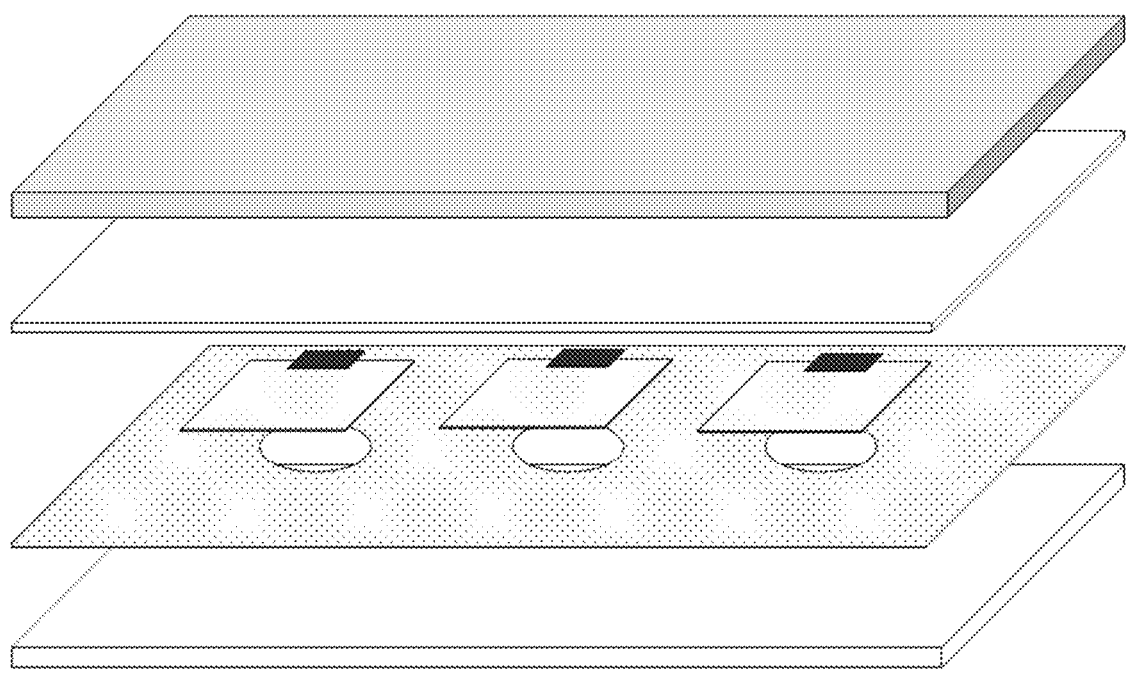

[FIG. 6]
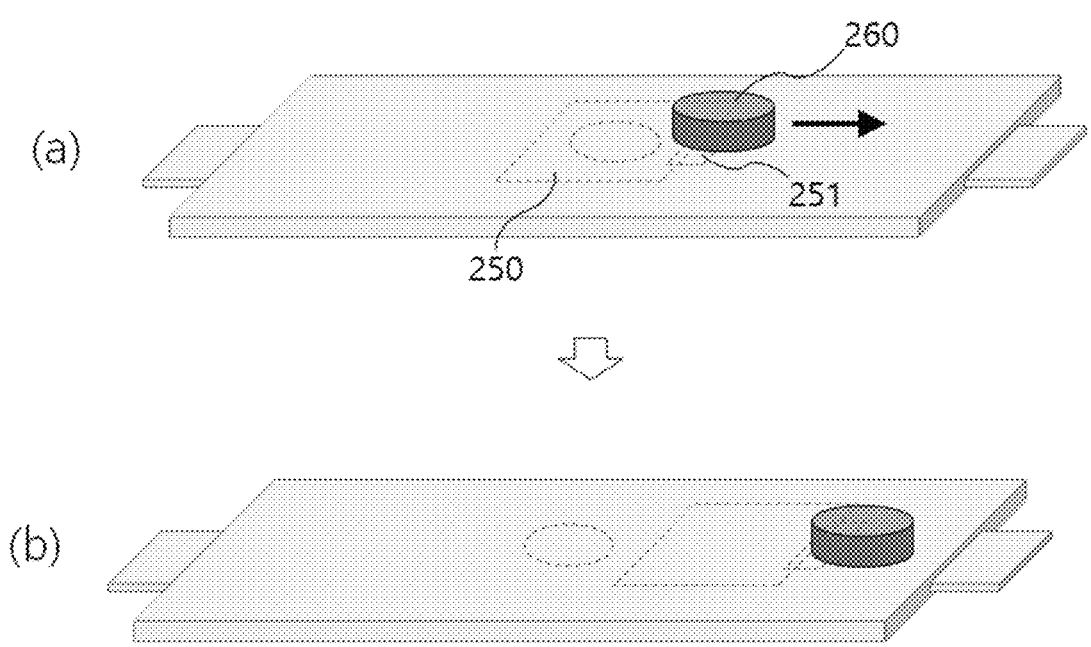

BATTERY CELL INCLUDING SHORT-CIRCUIT INDUCING MEMBER AND SAFETY EVALUATION METHOD USING SAME

TECHNICAL FIELD

The present invention relates to a battery cell including a short circuit induction member and a method for evaluating the safety of the battery due to an internal short circuit using the battery cell.

This application claims the benefit of priority based on Korean Patent Application No. 10-2019-0041138, filed on Apr. 9, 2019, and the entire contents of the Korean patent application are incorporated herein by reference.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte is injected or impregnated into the electrode assembly or a solid electrolyte is used to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

In general, the negative electrode has a structure in which a carbon-based active material is coated on an electrode plate made of copper or aluminum, and the positive electrode has a structure in which an active material made of $LiCoO_2$, $LiMnO_2$, $LiNiO_2$, or the like is coated on an electrode plate made of aluminum, etc.

In order to manufacture a positive electrode or a negative electrode, an electrode mixture including an electrode active material is coated on an electrode current collector made of a long metal sheet in one direction.

The separator is positioned between the positive electrode and the negative electrode of the battery to perform insulation and maintain the electrolyte to provide a passage for ion conduction.

The secondary battery is a rechargeable battery that is manufactured using a material that can repeat a plurality of redox processes between a current and a material. When the reduction reaction is performed on the material by the current, the power is charged, and when the oxidation reaction is performed on the material, the power is discharged. Herein, as the charge-discharge is repeatedly performed, electricity is generated.

The lithium secondary battery has a problem of low safety while having excellent electrical properties. For example, lithium secondary batteries generate heat and gas due to decomposition reaction of active materials and electrolytes, which are battery components, under abnormal operating conditions such as overcharge, overdischarge, exposure to high temperatures, and the resulting high temperature and high pressure conditions further promote the decomposition reaction and sometimes cause a fire or explosion.

In addition, it is very important to secure the safety even when an internal short circuit occurs in the battery, and for this purpose, it is important to correctly evaluate the safety of the battery when the internal short circuit occurs. As a battery stability item for lithium secondary batteries, details about a battery evaluation test for evaluating heat generation behavior during internal short circuits are explained in UL Standard for Lithium Batteries (UL1642), Guidelines from the Battery Industry Association (SBA G1101-1997 Lithium Secondary Battery Safety Evaluation Criteria Guidelines), etc.

There have been a method of putting a heating element inside the battery cell to induce an internal short circuit and generating internal heat by the heating element, a method of pre-drilling an internal separator and treating the area with chemicals to thereby be dissolved at a certain temperature, and a method of inducing an internal short circuit by tearing the separator by inserting a certain type of metallic material and applying external force. However, in the first method, the actual product and shape would be different due to the heating element inside the cell and the external heating source. In case of the second method, it was necessary to deform the actually used separator and chemical treatment was performed on the part where the separator was damaged, so there was a problem that the characteristics may be different from the existing products, and the desired reaction may not occur due to side reactions caused by the chemical reaction inside the cell.

On the other hand, US Patent Publication No. 2013-0209841 (Patent Document 1) discloses an internal short circuit induction device of a battery, in which after a separator is perforated, a copper plate is inserted into a battery cell, then copper and aluminum plates are put on both sides of the separator, and a wax layer is then installed between the copper plate and the separator or between the aluminum plate and the separator. When the temperature rises above the melting point of the wax layer in the internal short circuit induction device, the wax layer is removed and the positive and negative electrodes are electrically connected by copper and aluminum plates, causing an internal short circuit. However, this method has a problem that the manufacturing process of the internal short circuit induction device is complicated and the cost is high, and the battery cell should be disassembled and reassembled for repeated use.

DISCLOSURE

Technical Problem

The present invention was created to solve the above problems, and an object of the present invention is to provide a test battery cell for evaluating the safety of a battery without physically modifying the battery cell structure, and a method for evaluating the safety of the battery using the battery cell.

Technical Solution

A battery cell according to the present invention to achieve the above object includes:

a positive electrode; a negative electrode; a separator disposed between the positive electrode and the negative electrode and having at least one perforated portion; and a short circuit induction member disposed on the perforated portion.

Herein, the short circuit induction member includes a cover unit covering the perforated portion; and one or more magnetic units disposed on the side surface of the cover unit.

The short circuit induction member is inserted into a test battery cell including a positive electrode, a negative electrode, and a separator, is interposed between the perforated portion of the separator and the positive electrode and/or between the perforated portion of the separator and the negative electrode, and serves to induce an internal short circuit of the test cell by moving by a magnetic field applied from the outside.

Meanwhile, in order to prevent the short circuit due to contact between the positive electrode and the negative electrode through the perforated portion, the cover unit of the short circuit induction member should have a larger area than the perforated area so that it can completely cover the perforated portion. In addition, the shape of the cover unit is not limited to shapes such as a circle, ellipse, rectangle, triangle, etc., but the cover unit should be able to completely cover the perforated portion while maintaining the insulation between the negative electrode and the positive electrode.

Therefore, an insulating film may be used for the cover unit, and a porous polymer film may be used for internal ion exchange.

Further, the cover unit may move according to an external magnetic field, and may include a magnetic body to facilitate movement. At this time, an additional insulating coating may be applied to the surface of the magnetic body so that an unintended short circuit does not occur inside the battery cell due to the magnetic body.

However, in order to minimize the factors that may affect the short circuit evaluation in the battery cell, it is most preferable to apply the same material as the separator.

In addition, the magnetic unit is characterized in that at least one is attached to the end of the cover unit with a binder, and it is also possible to attach two or more magnetic units according to the moving direction.

The binder used for attaching the magnetic unit to the cover unit may contain one or more materials selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, epoxy resin, ethylene-propylene-diene polymer (EPDM), sulfonated EPDM, styrene butadiene rubber and copolymers thereof.

As the magnetic unit as described above is attached to the short circuit induction member, when a magnetic field is applied from the outside of the battery cell, the short circuit inducing member may move its position inside the battery cell according to the direction of the magnetic field.

At this time, the magnetic unit may include one or more metal materials having strong magnetism when a magnetic field is applied, such as Fe, Ni, and Co.

The perforated portion may be formed in the center of the separator, but is not limited thereto, and the position of the perforated portion can be changed according to the position to be shorted. In addition, it is also possible to form a plurality of perforated portions to arbitrarily adjust the position of the short circuit or to simulate a situation in which a short circuit occurs simultaneously in several places.

When a plurality of perforated portions are formed as described above, it is preferable that the short circuit induction member is also provided in the same quantity as the number of perforated portions formed.

Meanwhile, the safety evaluation method according to the internal short circuit of the battery using the above-described battery cell may include the following steps.

preparing a positive electrode, a negative electrode, and a separator having a perforated portion formed therein;

preparing a cover unit for covering the perforated portion and a magnetic unit;

manufacturing a short circuit induction member by attaching the magnetic unit to the cover unit;

placing the short circuit induction member on the perforated portion;

assembling a battery cell including the positive electrode, the negative electrode, the separator and the short circuit induction member;

applying a magnetic field to the short circuit induction member from an outside of the battery cell; and moving the short circuit induction member to expose the perforated portion.

When the short circuit induction member is moved to expose the perforated portion in the above-described step, the positive electrode and the negative electrode directly contact through the exposed perforated portion, thereby inducing an internal short circuit.

Advantageous Effects

A battery cell including a short circuit induction member of the present invention improves a problem that the battery cell is physically deformed after an internal short circuit evaluation test, which was the biggest problem of the conventional methods, and internal short circuits can be induced in a variety of conditions and environments without physical changes. In addition, since it is possible to experiment and evaluate without disassembly and reassembly, the process is simple and time and cost can be saved.

BRIEF DESCRIPTION OF THE DRAWINGS

FIG. 1 is a side view schematically showing a battery cell structure provided with a conventional short circuit induction member.

FIG. 2 is a side cross-sectional view schematically showing a structure of a battery cell provided with a short circuit induction member according to an embodiment of the present invention.

FIG. 3 is a perspective view schematically showing a structure of a battery cell provided with a short circuit induction member according to an embodiment of the present invention.

FIG. 4 is a perspective view schematically showing a structure of a battery cell provided with a short circuit induction member according to another embodiment of the present invention.

FIG. 5 is a perspective view schematically showing the structure of a battery cell provided with a short circuit induction member according to further another embodiment of the present invention.

FIG. 6 is a schematic view showing a method for evaluating safety using a battery cell having a short circuit induction member according to an embodiment of the present invention in steps.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. The terms used to describe various components are for understanding, and the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

In the specification of the present invention, "covering" means that the exposed part of an object is placed on one side so that the object is not visible, and when an object is "covered", it means that the exterior of the object is no longer revealed on the covered side. For example, "perforated portion is covered with the cover portion" means that the perforated portion is no longer exposed on one surface where the perforated portion is covered by the cover portion.

Hereinafter, the present invention will be described in detail.

The internal short circuit test is a test for evaluating the resistance to internal short circuit among the safety tests of the battery, and is a test simulated when a positive electrode and a negative electrode are shorted inside the battery. In the internal short circuit test, a fully charged evaluation battery is first prepared, an internal short circuit is generated, and the behavior of the battery is evaluated. In general, when an internal short circuit occurs, the battery is discharged and the voltage decreases, and the test is performed until the voltage decreases below a certain value to evaluate the presence or absence of rupture, and the voltage and temperature of the battery, etc.

FIG. 1 is a cross-sectional view schematically showing an electrode assembly 100 in which a conventional internal short circuit induction device developed by US Energy Research Institute (NREL) is installed.

Referring to FIG. 1, in the conventional short circuit induction member, the wax 140 is used as an insulator to prevent the negative electrode and the positive electrode from contacting during normal operation of the battery. However, when the battery rises to the melting point of the wax, the wax is removed, and an internal short circuit occurs due to contact between the negative electrode and the positive electrode.

Specifically, the conventional internal short circuit induction device creates a hole in a separator 120, inserts a block 140 made of a metal material such as copper into the hole, and interposes a wax layer 130 on one side of the metal plate. In addition, an aluminum plate 160 is attached to a portion where the wax layer of the separator is not interposed, and a copper plate 150 is attached to the wax layer 130.

After the internal short circuit induction device is installed on the separator 120 as described above, the separator 120, the negative electrode 110, and the positive electrode 111 are wound to prepare an electrode assembly.

In a lithium ion secondary battery, a redox reaction occurs as lithium ions move between negative and positive electrodes. However, in the case of the battery having the conventional short circuit induction member as described above, an unreacted region was formed because it was impossible to move lithium ions due to the aluminum plate and the copper plate in the portion where the short circuit induction member is installed. Due to the unreacted region, battery performance such as capacity was reduced compared to conventional batteries, and the accuracy of the safety evaluation was reduced because it was difficult to simulate the correct behavior of the battery when an internal short circuit occurred. In addition, in the case of the internal short circuit induction device as shown in FIG. 1, the manufacturing cost is high, and it is inconvenient to disassemble and reassemble the battery cell in order to reuse it after inserting it into the battery cell for assembly and testing. In addition, the structure in the battery cell may be deformed during this reassembly process, and this may cause safety problems.

In addition to the above-described method, there is a test method for the internal short circuit of a battery cell using a shape memory alloy. However, this also has a limitation that the battery should be heated to a certain temperature or higher, and there is a risk that the battery cell structure may be distorted due to physical changes of the shape memory alloy inserted in the battery cell.

Other known methods include nail penetration test and crush test. However, they irreversibly permanently deform the battery cell itself, and there is a problem in that a new battery cell should be manufactured for every test.

The battery cell including the short circuit induction member according to the present invention is a further improvement of the above-described prior art, and the short circuit induction member is characterized in that it includes a cover portion made of a porous polymer material and a magnetic portion containing a magnetic material.

The battery cell into which the short circuit induction member according to the present invention is inserted specifically has a structure in which an electrode assembly where a positive electrode, a negative electrode, and a separator having a short circuit induction member interposed between the positive electrode and the negative electrode are wound together, is built in a battery case. The shape of the battery, such as a cylindrical battery, a pouch-shaped battery, a prismatic battery, or a coin-shaped battery, is not limited, but in one embodiment of the present invention, a pouch-shaped battery was used.

The electrode assembly has a structure in which a negative electrode and a positive electrode are alternately stacked with a separator interposed between the electrodes and impregnated with a lithium salt non-aqueous electrolyte. The electrode for the secondary battery may be manufactured by applying an electrode mixture containing an electrode active material on a current collector and then drying the electrode mixture. The electrode mixture may further include a binder, a conductive material, a filler, and the like, as necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}CO_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or CO; olivine-based lithium metal phosphate represented by the formula $Li_{1+x}M+M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

The battery cell according to the present invention includes a positive electrode, a negative electrode, and a separator disposed between the positive electrode and the negative electrode, and a short circuit induction member is disposed on at least one perforated portion formed in the separator.

In addition, the short circuit induction member includes a cover unit covering the perforated portion; and one or more magnetic units disposed on the side surface of the cover unit.

A short circuit may occur due to the direct contact between the positive electrode and the negative electrode through the perforated portion. As the battery short circuit induction member of the present invention is disposed on one surface of the separator formed with the perforated portion, the cover unit of the short circuit induction member covers the perforated portion, thereby preventing an internal short circuit. That is, the short circuit induction member may be disposed between the positive electrode and the separator, or may be disposed between the negative electrode and the separator.

Meanwhile, in order to prevent the short circuit due to contact between the positive electrode and the negative electrode through the perforated portion, the cover unit of the short circuit induction member should have a larger area than the perforated area so that it can completely cover the perforated portion. In addition, the shape of the cover unit is not limited to shapes such as a circle, ellipse, rectangle, triangle, etc., but the cover unit should be able to completely cover the perforated portion while maintaining the insulation between the negative electrode and the positive electrode. That is, even if the area of the cover unit of the perforated portion is larger than the area of the perforated portion, when the shape is different, a part of the perforated portion may be exposed. Hence, the cover unit should be capable of completely blocking the direct contact between the positive electrode and the negative electrode through the perforated portion.

In addition, an insulating film may be used in the cover unit to maintain an insulating state, and a porous polymer film having insulating properties may be used as the cover unit for internal ion exchange.

The cover unit may move according to an external magnetic field, and may include a magnetic body to facilitate movement. At this time, an additional insulating coating may be applied to the surface of the magnetic body, if necessary, so that an unintended short circuit does not occur inside the battery cell due to the magnetic body. In addition, when the cover unit includes a magnetic body, the short circuit induction member may be formed of only a cover unit without a magnetic unit.

However, in order to minimize the factors that may affect the short circuit evaluation in the battery cell, it is most preferable to apply the same material as the separator. According to this, the short circuit induction member of the present invention may include a cover unit made of the same material as the separator and a magnetic unit enabling movement according to a magnetic field from the outside.

On the other hand, the magnetic unit included in the short circuit induction member is characterized in that one or two or more are attached to the end of the cover unit by a binder. The magnetic unit is for moving the short circuit induction member by a magnetic field applied from the outside of the battery cell. When the short circuit induction member moves according to the direction of the magnetic field, the perforated portion may be exposed when the cover unit covering the perforated portion is removed, and accordingly, the positive electrode plate can be in direct contact, resulting in an internal short circuit of the battery cell. That is, as the above-described magnetic unit is attached to the cover unit of the short circuit induction member, when applying a magnetic field from the outside of the battery cell provided with the short circuit induction member, the position of the short circuit induction member may be changed while moving inside the battery cell according to the direction of the magnetic field. When the perforated portion is exposed according to the movement of the short circuit induction member, a positive electrode and a negative electrode may be in direct contact and a short circuit may occur inside the battery cell.

If the binder for attaching the magnetic unit to the cover unit is designed so as not to affect the separator and the electrode layer of the short circuit induction member, and to prevent the conduction between the electrodes when a short circuit occurs by the short circuit induction member, there are no specific restrictions on the types of chemicals, and an epoxy resin composition may be used as long as the adhesive force is not lowered by the internal electrolyte.

Such binders may be made of one or more materials selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, epoxy resin, ethylene-propylene-diene polymer (EPDM), sulfonated EPDM, styrene butadiene rubber and copolymers thereof.

In particular, polyvinylidene fluoride (PVDF) among the chemicals is a material commonly used as a binder for electrodes, and has excellent chemical resistance and good mechanical, thermal, and electrical properties, which are advantages of fluorine resin. As such, it does not interfere with the electrical connection inside the battery cell while maintaining the adhesion between the cover unit and the magnetic unit of the short circuit induction member.

Meanwhile, the magnetic material is preferably a metal element having strong magnetism when applying a magnetic field, such as Fe, Ni, and Co, and one or more metal magnetic materials selected from the group consisting of these may be included in the magnetic unit.

With reference to the drawings, a short circuit induction member according to the present invention and a method for evaluating the safety of a battery using the same will be described in more detail.

FIGS. 2 and 3 are side cross-sectional views and perspective views schematically showing structures of a short circuit induction member and a battery cell into which a short circuit induction member is inserted according to an embodiment of the present invention.

Referring to FIG. 2, the short circuit induction member according to the present invention is inserted into a battery cell 200, the battery cell 200 may include a negative electrode 220, a positive electrode 240 and a separator 230 interposed therebetween, and the negative electrode 220/the separator 230/the positive electrode 240 may be stored in a pouch 210 type case.

The separator 230 is formed with a perforated portion 231, and the negative electrode 220 and the positive electrode 240 may be in direct contact through the perforated portion 231, causing a short circuit.

The short circuit induction member according to the present invention may include a cover unit 250 and a magnetic unit 251 attached to the cover unit 250, and may be interposed on one surface of the separator 230. Specifically, the short circuit induction member according to the present invention may be interposed on the perforated portion 231 formed in the separator 230. At this time, since the cover unit 250 of the short circuit induction member covers the perforated portion 231 formed in the separator 230 on one surface, direct contact between the negative electrode 220 and the positive electrode 240 can be prevented.

On the other hand, the location or area to be shorted can be changed as desired in perforated portion 231. According to another embodiment of the present invention shown in FIG. 4, unlike the FIGS. 2 and 3 in which the perforated portion 231 is formed at the center of the separator 230, the perforated portion 231 is formed at one end of the separator 230.

In addition, according to another embodiment of the present invention illustrated in FIG. 5, a total of three perforated portions are formed at both ends and the center of the separator 230. On the other hand, the short circuit induction members are provided in the same quantity as the number of perforated portions formed, and interference was not generated even when the sort circuit induction member was moved by making the direction of the attached magnetic unit 251 different from the direction of FIGS. 2 to 4.

As described above, the short circuit induction member according to the present invention can easily change the position or area of the short circuit by simply setting the position and size of the perforated portion differently, and when multiple positive and negative electrodes are stacked, it is possible to simulate details of a short circuit occurring in part or all of a specific layer.

In addition, the short circuit induction member of the present invention according to each of the embodiments of FIGS. 2 to 5 includes the magnetic unit 251 facing each other at the end of the cover unit 250. This is to attach the magnetic unit to the end portion in the direction in which the short circuit induction member moves when magnetism is applied from the outside. That is, the magnetic unit 251 is attached to the end portion in the direction in which the cover unit 250 moves by an external magnetic field on the basis of the center of the cover unit 250. When a magnetic field is applied from the outside, the magnetic unit 251 moves along the direction of the magnetic field while moving the cover unit 250 attached to the magnetic unit 251 together, and through this movement method, it is possible to prevent the phenomenon that the cover unit 250 is caught or folded while being pushed. That is, in the embodiment of FIGS. 2 to 4, it is preferable that the short circuit induction member moves in the long axis direction of the separator, and in the embodiment of FIG. 5, it is advantageous that the short circuit induction member moves in the short axis direction of the separator.

The method of inducing a short circuit due to the movement of the short circuit induction member by a magnetic field is specifically shown in FIG. 6.

Hereinafter, the internal short circuit safety evaluation method will be described in more detail with reference to FIG. 6. First, as shown in step (a) of FIG. 6, a magnetic field is applied from the outer surface of the battery cell provided with a short circuit induction member. At this time, the cover unit of the short circuit induction member is in a state that covers the perforated portion of the separator, and the positive electrode and the negative electrode facing through the perforated portion are in a state that are physically blocked by the cover unit and are not in direct contact.

The magnetic field is applied to the magnetic unit of the short circuit induction member, and the method of applying the magnetic field can be simply applied with a permanent magnet (260) such as neodymium, but is not limited thereto. Specifically, the magnetic unit is attached to the end of the cover unit in the direction of movement relative to the center of the cover unit, and after applying a magnetic field to the magnetic unit, the short circuit induction member is moved to pull out to the side to expose the perforated portion.

Referring to step (b) of FIG. 6, the short circuit induction member moves inside the battery cell according to a magnetic field applied from the outside. Due to this, the positive electrode and the negative electrode contact through the perforated portion formed in the separator, thereby causing an internal short circuit.

As described above, the safety evaluation method according to the internal short circuit of the present invention may specifically include the following steps.

preparing a positive electrode, a negative electrode, and a separator having a perforated portion formed therein;
preparing a cover unit capable of covering a magnetic unit and the perforated portion;
manufacturing a short circuit induction member by attaching the magnetic unit to the cover unit;
placing the short circuit induction member on the perforated portion;
assembling a battery cell including the positive electrode, the negative electrode, the separator and the short circuit induction member;
applying a magnetic field to the short circuit induction member from an outside of the battery cell;
moving the short circuit induction member to expose the perforated portion.

According to the above steps, as shown in (a) and (b) of FIG. 6, the perforated portion of the separator can be exposed by moving the short circuit induction member covering the perforated portion of the separator to one side. As the positive electrode and the negative electrode come into direct contact through the perforated portion of the separator, a short circuit may occur inside the battery cell.

DESCRIPTION OF REFERENCE NUMERALS

100: electrode assembly
110: negative electrode
111: positive electrode
120: separator
130: wax layer
140: block
150: copper plate
160: aluminum plate
200: battery cell
210: pouch
220: negative electrode
230: separator
231: perforated portion
240: positive electrode
250: cover unit
251: magnetic unit
260: permanent magnet

What is claimed is:

1. A battery cell comprising:
a positive electrode;
a negative electrode;
a separator disposed between the positive electrode and the negative electrode and having at least one perforated portion; and
a short circuit induction member disposed on the perforated portion,
wherein the short circuit induction member includes a cover unit covering the perforated portion; and
one or more magnetic units disposed on a side surface of the cover unit.

2. The battery cell of claim 1, wherein the short circuit induction member is disposed between the positive electrode and the separator, or between the negative electrode and the separator.

3. The battery cell of claim 1, wherein an area of the cover unit is larger than an area of the perforated portion.

4. The battery cell of claim 1, wherein the cover unit comprises one or a combination of two or more selected from the group consisting of an insulating film, a porous polymer film, and a magnetic body.

5. The battery cell of claim 1, wherein the cover unit comprises the same material as that of the separator.

6. The battery cell of claim 1, wherein the magnetic unit is attached to the cover unit by a binder.

7. The battery cell of claim 6, wherein the binder contains one or more materials selected from the group consisting of polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, epoxy resin, ethylene-propylene-diene polymer (EPDM), sulfonated EPDM, styrene butadiene rubber and copolymers thereof.

8. The battery cell of claim 1, wherein the magnetic unit contains one or more magnetic materials selected from the group consisting of Fe, Ni, and Co.

9. The battery cell of claim 1, wherein the battery cell includes the same quantity of the short circuit induction members as the perforated portions.

10. A method for evaluating safety according to an internal short circuit of a battery, the method comprising:
preparing a positive electrode, a negative electrode, and a separator having a perforated portion formed therein;
preparing a cover unit capable of covering a magnetic unit and the perforated portion;
manufacturing a short circuit induction member by attaching the magnetic unit to the cover unit;
placing the short circuit induction member on the perforated portion;
assembling a battery cell including the positive electrode, the negative electrode, the separator and the short circuit induction member;
applying a magnetic field to the short circuit induction member from an outside of the battery cell; and
moving the short circuit induction member to expose the perforated portion.

11. The method of claim 10, wherein a location of the short circuit induction member is moved by a magnetic field applied from an outside of the battery cell.

* * * * *